US012767561B2

(12) United States Patent
Rydland

(10) Patent No.: US 12,767,561 B2
(45) Date of Patent: Oct. 20, 2026

(54) DISPOSAL OF CONTAMINATED WATER

(71) Applicant: CONOCOPHILLIPS COMPANY, Houston, TX (US)

(72) Inventor: Carl Jonas Rydland, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 160 days.

(21) Appl. No.: 18/784,381

(22) Filed: Jul. 25, 2024

(65) Prior Publication Data

US 2025/0034000 A1 Jan. 30, 2025

Related U.S. Application Data

(60) Provisional application No. 63/529,583, filed on Jul. 28, 2023.

(51) Int. Cl.
*C02F 1/04* (2023.01)
*C02F 103/34* (2006.01)

(52) U.S. Cl.
CPC .............. *C02F 1/048* (2013.01); *C02F 1/043* (2013.01); *C02F 2103/34* (2013.01); *C02F 2201/002* (2013.01)

(58) Field of Classification Search
CPC ...... C02F 1/043; C02F 1/048; C02F 2103/34; C02F 2201/002
See application file for complete search history.

(56) References Cited

U.S. PATENT DOCUMENTS

| | | | | | |
|---|---|---|---|---|---|
| 3,159,554 | A | * | 12/1964 | Mount | C02F 1/14 159/DIG. 42 |
| 4,003,365 | A | * | 1/1977 | Wiegand | F24S 80/525 126/621 |
| 4,091,800 | A | * | 5/1978 | Fletcher | F24S 10/13 126/567 |
| 4,235,679 | A | * | 11/1980 | Swaidan | B01D 5/0066 203/DIG. 1 |
| 4,345,581 | A | * | 8/1982 | Shacher | F24S 10/13 126/561 |

(Continued)

FOREIGN PATENT DOCUMENTS

WO 2021030429 A1 2/2021

OTHER PUBLICATIONS

International Search Report for PCT/US24/39642 mailed Oct. 11, 2024; 3 pgs.

*Primary Examiner* — Jonathan Miller
(74) *Attorney, Agent, or Firm* — CONOCOPHILLIPS COMPANY

(57) ABSTRACT

The rate of evaporation in an evaporation pond containing contaminated produced or process water from a hydrocarbon production operation is increased by pumping water from just beneath the surface of the pond through a pipe extending around the periphery of the pond. The water is dispensed around the periphery of the pond from ports in the pipe and then trickles down into the pond water. The pond has a black plastic lining, with a border region that is not submerged. The water from the pipe trickles down across the un-submerged black lining that is at an elevated temperature due to radiative solar heating, and energy is thereby imparted to the water to increase the rate of evaporation.

14 Claims, 1 Drawing Sheet

(56) References Cited

U.S. PATENT DOCUMENTS 4,405,264 A * 9/1983 Brady ........................ E02B 5/02
405/36
4,428,842 A * 1/1984 House .................... E21B 41/005
210/750
4,449,849 A * 5/1984 Horn ...................... E21B 21/065
405/52
4,713,172 A * 12/1987 Horn ........................ C02F 1/048
210/197
4,771,246 A * 9/1988 Boryta ..................... G01M 3/40
324/559
6,767,433 B2 * 7/2004 Foster ........................ C02F 1/14
220/560.08
6,821,395 B1 * 11/2004 Ward ......................... C02F 1/14
203/DIG. 1
7,491,333 B1 * 2/2009 Luke ........................ C02F 1/441
210/906
8,016,977 B2 * 9/2011 Rasmussen ............. B05B 1/202
159/901
8,256,748 B1 * 9/2012 Boulter ................. E21B 41/005
261/78.2
8,871,094 B2 * 10/2014 Spiroff ....................... C02F 3/28
210/603
9,943,774 B2 * 4/2018 Duesel, Jr. ............... B01D 1/14
9,969,626 B2 5/2018 Gawlik et al.
9,975,059 B2 * 5/2018 Carroll ..................... C02F 1/048
11,891,320 B1 * 2/2024 Hockaday ............. C02F 3/2866
11,897,786 B2 * 2/2024 Palutis ....................... C02F 1/12
2007/0227674 A1 10/2007 Haslem et al.
2014/0144837 A1 * 5/2014 Spiroff ....................... C02F 3/28
210/601
2016/0325202 A1 * 11/2016 Phillips ................... C02F 1/048
2017/0001126 A1 * 1/2017 Carroll ...................... B01D 1/16
2017/0283288 A1 * 10/2017 Chaffee ...................... C02F 3/08
2020/0255303 A1 8/2020 Wang et al.
2025/0034000 A1 * 1/2025 Rydland .................. C02F 1/048

* cited by examiner

DISPOSAL OF CONTAMINATED WATER

CROSS-REFERENCE TO RELATED APPLICATIONS

This application is a non-provisional application which claims benefit under 35 USC § 119(e) to U.S. Provisional Application Ser. No. 63/529,583 filed Jul. 28, 2023, entitled “Disposal of Contaminated Water,” which is incorporated herein in its entirety.

FEDERALLY SPONSORED RESEARCH AND DEVELOPMENT

None.

FIELD OF THE INVENTION

This invention relates to increasing the rate of evaporation from an evaporation pond, for example an evaporation pond for the disposal or reduction in volume of contaminated water from hydrocarbon production operations.

BACKGROUND OF THE INVENTION

In onshore hydrocarbon production operations, a great deal of contaminated water is often created, e.g. produced water or injected water returned to surface. This water needs to be disposed of sometimes by injecting into a disposal well or by transporting it in trucks to another site for disposal. Since such wells are expensive and have limited capacity, the contaminated water is often stored in large shallow ponds from which some of the water may evaporate. Especially in warm climates, this can be an effective way of reducing water volume at relatively low cost. Nonetheless, it would be desirable to increase further the rate of evaporation from such ponds without adding substantially to their cost and, especially, without taking up more land.

Previous attempts to increase the rate of evaporation have included spraying the water above the pond, but this has the problem that the spray may be carried away by the wind resulting in contamination of the surrounding land. This and other proposed systems for increasing the rate of evaporation from ponds are quite complex.

U.S. Pat. No. 9,969,626B2 (Gawlick et al.) describes a system of heating air using solar energy and bubbling the air though pond water to increase evaporation rates. US2020255303A1 (Wang et al.) describes a raised structure onto which water is pumped to aid evaporation. WO2021/030429A1 (Juranitch et al.) described a system for generating spray to aid evaporation.

SUMMARY OF THE INVENTION

Evaporation ponds are normally made by creating a shallow hollow in the ground and lining it with an impermeable material, commonly a black plastic membrane. Commonly, the pond is not filled to its outer edge and there is a border region of non-submerged black plastic sheeting gently sloping down to the water. Evaporation ponds are often constructed in hot climates for obvious reasons. The un-submerged black plastic will reach an elevated temperature due to radiative solar heating. Running water down this exposed region of black membrane will impart heat energy to the water running over the membrane and increase the rate of evaporation. A pump may be used to circulate the water; the water may be taken from just beneath the water surface where it is already warmest. The pump need not be very powerful since its only function is to raise the level of the water by a small height, e.g. 1-5 metres. The pump may conveniently be powered from one or more solar panels.

In one embodiment, a process for increasing the rate of evaporation in an evaporation pond, wherein the pond comprises a depression in the ground with a water impermeable lining, and wherein the process comprises:

a) installing a tubing around the periphery of the pond, above a region of the pond lining that is not submerged, wherein the pipe includes perforations or nozzles;
b) circulating water from the pond through the pipe such that water is delivered through the perforations or nozzles; and
c) allowing the water to run over the un-submerged region of lining, such that evaporation of the water is promoted.

The pond lining may be black and may have a matt surface texture, both of which promote the absorption of radiant heat from the sun. The pond lining may be a membrane of plastics material. The pond lining may be plastic, thermoplastic polyolefin, polyvinyl chloride, ethylene propylene diene monomer, high-density polyethylene, rubber, fiberglass, coated woven fabrics, coated non-woven fabrics, coated knitted fabrics, and the like. The pond lining may include a fabric liner over the pond lining to wick water from the pond and disperse water pumped through the pipe. The fabric may be a woven fabric, canvas, cotton, denim, linen, nylon, polyester, vinyl, fiberglass, rubber, mesh, felt, coated, cooling, wicking, natural, synthetic, coated, chemically resistant, or other material. In one embodiment a weed mat is placed over the pond liner to absorb heat and increase surface area for evaporation. In another embodiment used burlap is placed on the pond liner to absorb heat and increase surface area for evaporation. In yet another embodiment a dark or black fabric is used to increase heat absorption and evaporation.

The tubing may include pipe or hose consisting of plastic, rubber, polyvinylchloride (PVC), polypropylene (PP), polyethylene (PE), polytetrafluoroethylene (PTFE), fluorinated ethylene propylene (FEP), polyketones (PEEK, PEK, PEKK), polyurethane (PU), nylon (polyamide), ethyl vinyl acetate (EVA), acrylic, other polymer or other material including copper, steel, aluminum, and the like. The tubing may also be a fabric hose or pipe consisting of a polymer, rubber, fiber, fabric or other material including a “soaker,” “weep,” or fabric hose that seeps water. Different materials may be used dependent upon the properties of pond water and may be chemically resistant, heat resistant, acid resistant, sulfur resistant, if required.

A pump may be installed to circulate water from the pond through the tubing. The pump may be installed on a floating unit on the pond. It may be powered by one or more solar panels, which may be mounted on the same or a separate floating assembly.

Water for circulation may be drawn from near the surface of the pond, so that it has already been warmed by the sun.

The water may be produced or process water from hydrocarbon production operations.

The water may need to be pumped through a height of between 1 and 5 metres from the pond water surface to the peripheral pipe.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms “comprises,” “comprising,” “includes,” “including,” “has,” “having” or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: “for example,” “for instance,” “e.g.,” “In some examples,” and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

BRIEF DESCRIPTION OF DRAWINGS

A more complete understanding of the present invention and benefits thereof may be acquired by referring to the follow description taken in conjunction with the accompanying drawings in which.

DETAILED DESCRIPTION OF THE INVENTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1A:
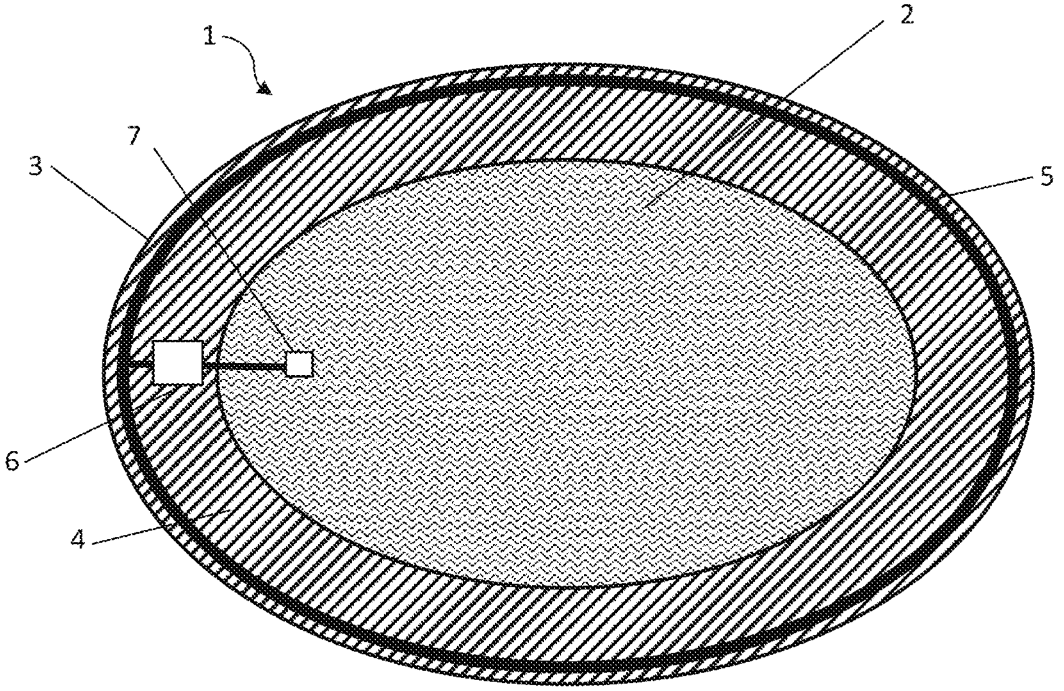
FIG. 1*a* is a schematic plan view of an evaporation pond according to the invention.
Figure 1B:
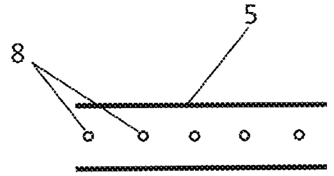
FIG. 1*b* is a detail schematic of a length of apertured pipe.
Figure 2:
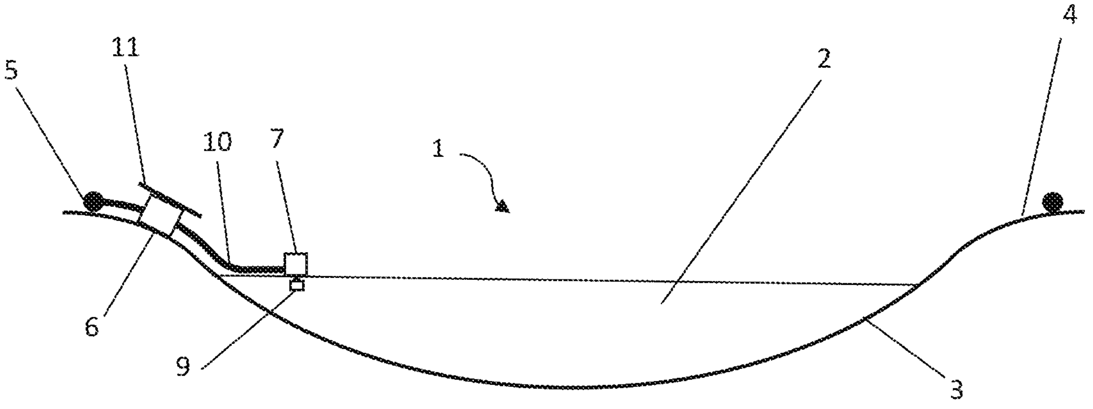
FIG. 2 is a schematic side section of the evaporation pond of FIG. 1*a*.

As shown in FIGS. 1 and 2, an evaporation pond 1 comprises a large membrane 3 of suitable plastics material that is waterproof and weather resistant, e.g. PVC. The membrane 3 has a black colour and a matt or gloss surface texture. Matt is preferred, since radiant energy is normally absorbed more efficiently by a matt surface. Water 2 is contained in the pond and there is a border region 4 of un-submerged membrane. A PVC pipe 5 of approximately 10 cm diameter runs all around the periphery of the pond, at the top of the border region 4. The pipe 5 has apertures 8 (see FIG. 1*b*) at regular intervals along its length. In an alternative embodiment, the pipe has a larger diameter, e.g. 20-30 cm, at the end nearer the pump outlet and decreasing diameter along the pipe as the volume flow rate of water through the pipe decreases.

The pond in this example is representative of evaporation ponds used in the hydrocarbon industry and has a perimeter length of 780 metres. When the pond is at an average fill level, the surface area of the exposed un-submerged membrane in this example is approximately 4500 m2.

Water is supplied drawn from the pond into the pipe 5 via a feed pipe 10. A low power electric pump 6 draws water through the feed pipe 10. The pump inlet is mounted beneath a floating unit 7 on the pond, so as to draw water from just beneath the water surface. The inlet is fitted with a strainer 9. By having the inlet just below the surface the amount of silt entering the pump is minimized. However, a strainer is still a useful precaution to protect the pump.

In an alternative configuration, the pump 6 is also mounted on the floating unit 7, with some or all of the pump, including its motor, submerged. This has the advantage of helping to cool the pump, although the main cooling effect in this type of pump is normally produced by pumped water flowing past the motor and is therefore not dependent on the pump being submerged. Alternatively, the pump could be located on the pond bed. Pumps suitable for this type of application are well known and easily available.

The pump 6 in this example is powered by a solar panel or array of panels 11; a battery backup may be provided to ensure water flows even when the sun is not out. The solar panel or array of panels 11 may alternatively be located on the floating unit 7 or on a separate floating unit, or on land adjacent the pond. As an alternative, if there is a convenient supply of electrical power on site then this may be used to power the pump.

The pond is located in an environment with a lot of sunshine. As the pump is powered from the solar panel 11, water from just below the surface that has already been warmed by the sun is drawn up through the feed pipe 10. The water enters the pipe 4 and is then dispensed out of the apertures/ports 8 in the pipe 5.

Water discharged from the pipe apertures runs across the border area 4, which has a slight slope. The matt black membrane 3 in the border region 4 has been heated by radiant solar energy. Heat from the membrane 3 is passed to the water mainly by conduction as the water runs across the membrane. The temperature of the water is thereby raised and thus the rate of evaporation of the water is increased.

Evaporation rate may be increased further by incorporating spray nozzles into the pipe. This may provide for a more even, thinner layer of water running down the membrane, which would result in faster heat transfer and thus evaporation.

Spray nozzles may also produce some airborne spray which could also increase overall evaporation rates as the surface area of water in contact with air is increased by creating airborne droplets. If significant airborne spray is produced, a barrier may need to be erected around the pond to prevent drift of spray with resulting risk of pollution of the surrounding land.

The inventor has not yet established the ideal flow rate of water per metre of pipe, but as an example 0.1 litre per second per metre of pipe may be used. This equates to a total volume flow rate of 78 litres per second. In this example the average water level in the pond is 3 metres below the pipe running around the periphery. Taking g as 10 N/kg, raising 78 litres (78 kg) of water by a height of 3 metres requires a theoretical minimum of 2,340 J of energy. Therefore, a theoretical minimum power of 2.34 kW would be required to raise 78 litres of water by 3 m each second.

However, flow resistance in the pipe and apertures is likely to be the largest factor in working out what power of pump may be required. The diameter of the pipe may have a large effect, and it may be advantageous to use a pipe with a relatively large diameter near the pump outlet, with the diameter reducing around the pond perimeter as the flow volume in the pipe reduces. There will also be the inherent inefficiency of the pump to take into account.

The inventor has carried out rough calculations that indicate a total pressure loss of approximately 90 meters in the pipe all along the perimeter. To overcome this, the pump motor may need to be approximately 100 kW.

In bright sunshine a one m2 solar panel can produce 1 kW of electrical power, so a 100 m2 or more array of panels may produce sufficient power to drive the pump in this example. Whilst these figures are very approximate rough calculations, they may at least give an indication of an order of magnitude of the size of solar array needed. A 100 m2 array is very modest in comparison with the area of land taken up by the pond, or if mounted on a floating unit, in comparison with the water surface area of the pond which is likely to be many 1000s of square metres.

The inventor believes that, for a given pond size, the arrangement described above may provide a greater increase in evaporation per unit of power input, than other available methods.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents. At the same time, each and every claim below is hereby incorporated into this detailed description or specification as an additional embodiments of the present invention.

REFERENCES

In closing, it should be noted that the discussion of any reference is not an admission that it is prior art to the present invention, especially any reference that may have a publication date after the priority date of this application. Each of the references below is incorporated in their entirety for all purposes. Incorporated references are listed again here for convenience:

U.S. Pat. No. 9,969,626 (Gawlik, et al.,) "Techniques for increasing the evaporation rate in evaporation ponds," (2015).

US2020255303 (Wang, et al.,) "Method and Device for Water Evaporation," (2018).

WO2021030429 (Juranitch & Reynolds) "Produced Water Evaporation System," (2020).

The invention claimed is:

1. A process for increasing the rate of evaporation in an evaporation pond, wherein the pond comprises a depression in the ground with a water impermeable lining, and wherein the process comprises:

a) installing a tubing around the periphery of the pond, above a region of the pond lining that is not submerged, wherein the tubing includes perforations or nozzles;

b) circulating water from the pond through the tubing such that water is delivered through the perforations or nozzles; and c) discharging the water across the un-submerged region of lining, such that evaporation of the water is promoted, without significant production of airborne spray.

2. The process according to claim 1, wherein the pond lining is black.

3. The process according to claim 1, wherein the pond lining has a matt surface texture.

4. The process according to claim 1, wherein the pond lining is a membrane selected from plastics, thermoplastic polyolefin, polyvinyl chloride, ethylene propylene diene monomer, high-density polyethylene, rubber, fiberglass, coated woven fabrics, coated non-woven fabrics and coated knitted fabrics.

5. The process according to claim 1, wherein the pond lining is covered with a fabric selected from a woven, knitted, canvas, cotton, denim, linen, nylon, polyester, vinyl, fiberglass, rubber, mesh, felt, non-woven, coated, wicking, natural, synthetic and a chemically resistant material.

6. The process according to claim 1, wherein the tubing is a pipe or hose comprising a material selected from plastic, rubber, polyvinylchloride (PVC), polypropylene (PP), polyethylene (PE), polytetrafluoroethylene (PTFE), fluorinated ethylene propylene (FEP), polyketones (PEEK, PEK, PEKK), polyurethane (PU), nylon (polyamide), ethyl vinyl acetate (EVA), acrylic, copper, steel and aluminum.

7. The process according to claim 1, wherein the tubing is a fabric, weep, or soaker hose that seeps fluid.

8. The process according to claim 1, wherein a pump is installed to circulate water from the pond through the tubing.

9. The process according to claim 8, wherein the pump is installed on a floating unit on the pond.

10. The process according to claim 8, wherein the pump is powered by one or more solar panels.

11. The process according to claim 10, wherein the said one or more solar panels are mounted on a floating unit on the pond.

12. The process according to claim 1, wherein water for circulation is drawn from near the surface of the pond.

13. The process according to claim 1, wherein the water is produced or process water from hydrocarbon production operations.

14. The process according to claim 1, wherein the water is pumped over a height of between 1 and 5 metres.

* * * * *